(12) United States Patent
Momose et al.

(10) Patent No.: US 9,121,741 B2
(45) Date of Patent: Sep. 1, 2015

(54) ELECTROMAGNETIC FLOW METER

(71) Applicant: Azbil Corporation, Tokyo (JP)

(72) Inventors: Osamu Momose, Tokyo (JP); Youhei Sakano, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 24 days.

(21) Appl. No.: 14/217,693

(22) Filed: Mar. 18, 2014

(65) Prior Publication Data

US 2014/0260663 A1    Sep. 18, 2014

(30) Foreign Application Priority Data

Mar. 18, 2013    (JP) .................................. 2013-054637

(51) Int. Cl.
*G01F 1/58*    (2006.01)
*H01L 43/08*   (2006.01)
*G01F 1/60*    (2006.01)

(52) U.S. Cl.
CPC ........................................ *G01F 1/60* (2013.01)

(58) Field of Classification Search
CPC ........... G01F 1/58; H01L 43/08; G01B 21/00; G01R 19/00

USPC ........ 73/861.12; 324/20; 330/277; 340/636.1
See application file for complete search history.

(56) References Cited

U.S. PATENT DOCUMENTS

| | | | |
|---|---|---|---|
| 6,255,910 B1* | 7/2001 | Forstner ......................... | 330/289 |
| 7,286,019 B2* | 10/2007 | Peng et al. .................... | 330/311 |
| 7,948,321 B2* | 5/2011 | Honda et al. .................. | 330/296 |

FOREIGN PATENT DOCUMENTS

JP    H8-021756 A    1/1996

* cited by examiner

*Primary Examiner* — Jewel V Thompson
(74) *Attorney, Agent, or Firm* — Troutman Sanders LLP

(57) ABSTRACT

In an electromagnetic flow meter, a signal amplifying circuit has an FET-input type differential amplifier wherein one input terminal is connected to a flow rate signal input terminal and the other input terminal is connected to a flow rate signal input terminal. An amplified output signal, which is obtained through performing differential amplification on the flow rate signals, is outputted from an output terminal. A fault detecting circuit detects a fault in the flow rate signal through comparing the electropotential of the amplified output signal to an upper limit reference electropotential and a lower limit reference electropotential.

2 Claims, 4 Drawing Sheets

ELECTROMAGNETIC FLOW METER

CROSS REFERENCE TO RELATED APPLICATION

This application claims priority under 35 U.S.C. §119 to Japanese Patent Application No. 2013-054637, filed on Mar. 18, 2013, the entire content of which being hereby incorporated herein by reference.

FIELD OF TECHNOLOGY

The present invention relates to an electromagnetic flow meter, and, in particular, relates to a fault detecting technology for detecting that a flow rate signal fault from a pair of detecting electrodes that is disposed within a pipe.

BACKGROUND

Typically, in electromagnetic flow meters for measuring the flow rate of a fluid that is electrically conductive, the flow rate of the fluid that flows within a pipe is measured by providing a magnetic excitation electric current that alternatingly switches polarities to a magnetic excitation coil that is disposed so that the direction of the magnetic field that is produced is perpendicular to the direction of flow of the fluid that is flowing within the pipe, to detect and differentially amplify, using a signal amplifying circuit, a signal electromotive force that is produced between a pair of detector electrodes that are disposed within the pipe perpendicular to the magnetic field produced by the magnetic excitation coil, and sampling and performing signal processing on the flow rate signal that is produced.

Such an electromagnetic flow meter, is provided with a fault detecting (empty detecting) function wherein, when the fluid within the pipe goes to empty so that the detecting electrodes of the detector no longer contact the fluid, or when a signal line in the detector is broken or disconnected, or the like, a fault state (an empty state) wherein a signal that has undergone differential amplification shows a value that is not normal, is detected, and an alarm is sent to a higher-level device. See, for example, Japanese Unexamined Patent Application Publication No. H8-021756.

FIG. 4 is a block diagram illustrating a configuration for a conventional electromagnetic flow meter.

In a signal amplifying circuit 52, flow rate signals that consist of signal electromotive forces that are detected by detecting electrodes TA and TB of a pipe Pex are read in through flow rate signal input terminals T11 and T12, and pass through buffer amplifiers U11 and U12 and coupling capacitors C11 and C12, to undergo differential amplification by an operational amplifier U13.

The output signal of U13 undergoes A/D conversion by an A/D converting circuit 55 after having the low-frequency component, such as power supply noise, removed by a high-pass filter (HPF) 54.

The controlling circuit (CPU) 56 performs a calculation process on the A/D-converted value to calculate a flow rate measured value, and notifies a higher-level device from the output interface circuit 57.

On the other hand, in a fault detecting circuit 53, the input electropotential V11 of one of the flow rate signals that are inputted into U13 is compared to a reference voltage Va by a comparator U21, and the comparison result V13 is outputted to the controlling circuit 56. Moreover, the input electropotential V12 of the other flow rate signals that are inputted into U13 is compared to a reference voltage Va by a comparator U22, and the comparison result V14 is outputted to the controlling circuit 56.

If in a normal state wherein the pipe Pex is filled with an adequate amount of fluid, then the detecting electrodes TA and TB and the ground electrode TC are connected electrically through the fluid. Because of this, the central electropotential between V11 and V12 is equal to the ground electropotential.

On the other hand, T11 and T12 in the signal amplifying circuit 52 are connected to power supply electropotentials +Vc and −Vc through resistive elements R11 and R12. Because of this, if the fluid within the pipe becomes empty, so that the detecting electrodes TA and TB of a detector 60 cease to contact the fluid, or if a signal line of the detector 60 becomes broken or detached, then V11 and V12 will go to +Vc and −Vc, respectively.

Consequently, setting the reference voltage Va for the fault detecting circuit 53 to a value that is higher than the negative amplitude peak value for the flow rate signal when operating properly and lower than +Vc, and setting the reference value −Va to a value that is lower than the positive-side amplitude peak value of the flow rate signal when operating properly and higher than −Vc makes it possible to detect a fault such as a state wherein there is no contact with the fluid or a state wherein a signal line is broken or disconnected.

In this way, in the signal amplifying circuit 52 of the conventional electromagnetic flow meter, the input impedance of the signal amplifying circuit 52 must be as high as possible so as to not produce attenuation in the flow rate signal, even if the fluid that is being measured has low electrical resistivity.

Because of this, FET input-type amplifiers, wherein the input impedance is high and the input bias current is low, are used as the buffer amplifiers U11 and U12.

However, while, in such a conventional technology, if it is possible to provide an adequate magnetic excitation current to the magnetic excitation coil Lex, to measure a normal electrically conductive fluid using a four-line electromagnetic flow meter wherein a relatively large signal electromotive force is produced, then there would be no problem even with the resistive elements R11 and R12 still connected, but if measuring, using the four-line method, a fluid of low electrical conductivity, or if the amount of magnetic excitation current that can be provided to the magnetic excitation coil Lex is limited, or with a two-line electromagnetic flow meter wherein the signal electromotive force that can be produced is extremely small, then the flow rate signal will be attenuated by the resistive elements R11 and R12, and thus there is a problem in that this will have an adverse effect on the signal-to-noise ratio.

Moreover, there is a problem with an increase in the contact resistance through adherence of insulating substances that are produced through electrochemical reactions between the electrodes of the detector and the fluid interface because of the supply of electric currents from the resistive elements R11 and R12 to the electrodes TA and TB.

Because of this, there is the need for countermeasures such as inserting switches in series with R11 and R12 and switching them OFF at the time of a flow rate measurement, to block the supply of the DC current to the TA and TB side, and switched ON to provide the electric current to the TA and TB side only when performing fault detection.

The present invention is to solve problems such as this, and an aspect thereof is to provide a fault detecting technology able to detect a fault state of a flow rate signal without supplying a DC electric current to the detecting electrodes through resistive elements.

SUMMARY

In order to achieve the above-noted aspect, the electromagnetic flow meter according to the present invention is an electromagnetic flow meter wherein a controlling circuit calculates a flow rate measurement value for a fluid that flows in a pipe from an A/D converted value that is obtained through performing A/D conversion after differential amplification has been performed, by a signal amplifying circuit, on a flow rate signal that is detected by a pair of detecting electrodes that are disposed within the pipe and inputted through first and second flow rate signal input terminals, wherein:

the signal amplifying circuit has an FET input-type instrumentation amplifier with one input terminal connected to the first flow rate signal input terminal and the other input terminal connected to the second flow rate signal input terminal, for outputting, from the output terminal, an amplified output signal obtained through performing differential amplification on the flow rate signal; and a fault detecting circuit for detecting the flow rate signal fault through comparing the electropotential of the amplified output signal to an upper limit reference electropotential and a lower limit reference electropotential.

Moreover, in one example configuration of the electromagnetic flow meter according to the present invention, the controlling circuit detects a flow rate signal fault through comparing the frequency of the amplified output signal to a magnetic excitation frequency variability tolerance range, and if the detection result thereof or the detection result by the fault detecting circuit is that a fault has been detected, concludes that there is a fault in the flow rate signal.

In the present invention, the electropotential of the amplified output signal obtained by the signal amplifying circuit is compared to an upper limit reference electropotential and a lower limit reference electropotential to detect a fault in the flow rate signal. Because of this, a fault state in the flow rate signal can be detected without supplying a DC current to the detecting electrodes through resistive elements.

BRIEF DESCRIPTIONS OF THE DRAWINGS

DETAILED DESCRIPTION

A form for carrying out the present invention will be explained next in reference to the figures.

Example

Figure 1:
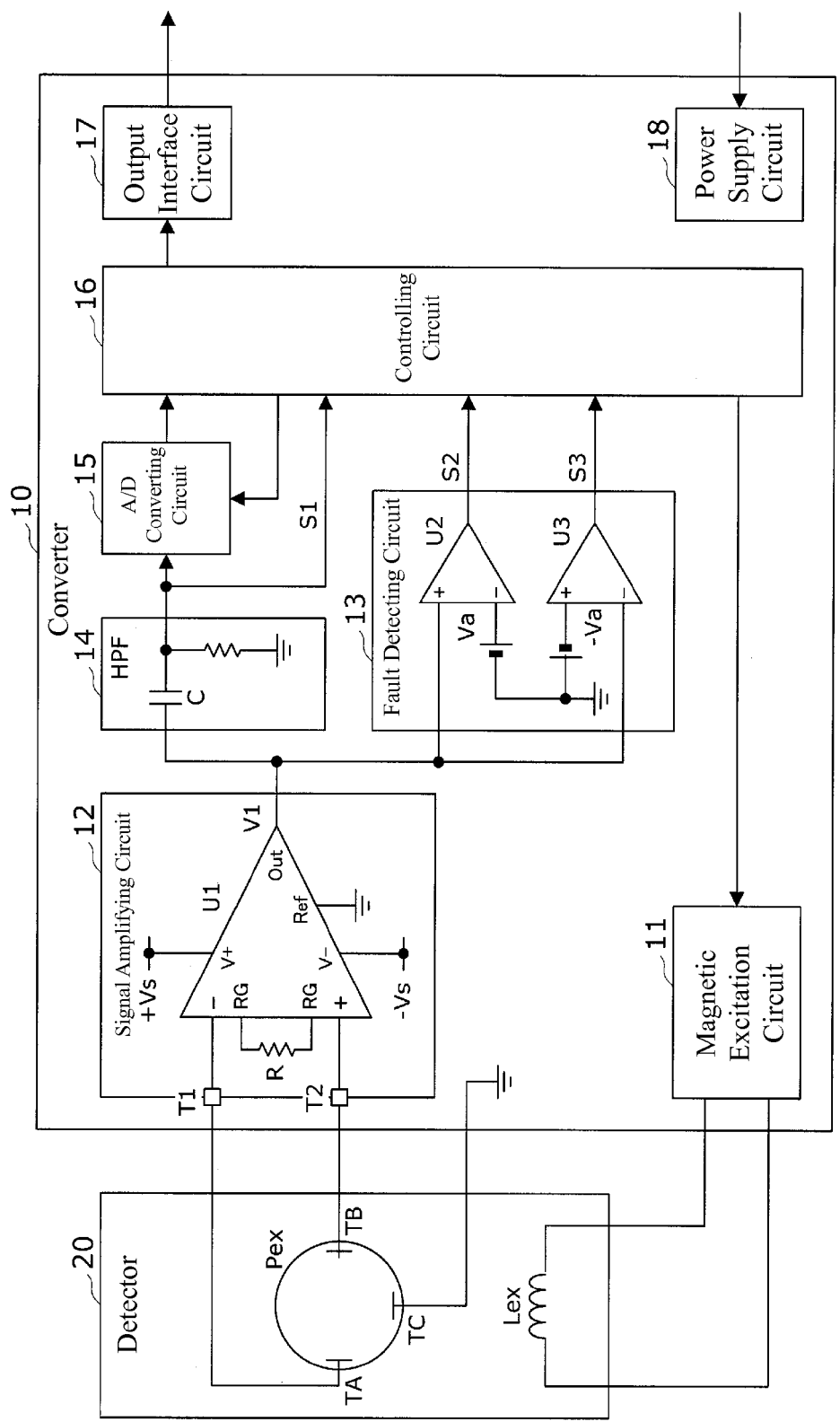
FIG. 1 is a block diagram illustrating a structure of an electromagnetic flow meter according to the present invention.

FIG. 1 will be referenced first to explain the electromagnetic flow meter 1 according to the present example. FIG. 1 is a block diagram illustrating a structure of an electromagnetic flow meter according to the present invention.

This electromagnetic flow meter 1 is structured from a converter 10 and a detector 20 and has a function for measuring the flow rate of a fluid that has electrical conductivity.

The detector 20 is provided with a pipe Pex wherein flows the fluid that is subject to the flow rate measurement, and a magnetic excitation coil Lex for magnetically exciting the fluid within Pex.

The converter 10 has, as its primary circuit portions, a magnetic excitation circuit 11, a signal amplifying circuit 12, a fault detecting circuit 13, a high-pass filter (HPF) 14, an A/D converting circuit 15, a controlling circuit (CPU) 16, an output interface circuit 17, and a power supply circuit 18.

At the time of a measurement, first a magnetic excitation electric current wherein the polarity switches alternatingly is applied from a magnetic excitation circuit 11 to a magnetic excitation coil Lex that is disposed so that the direction in which the magnetic field is produced is perpendicular to the direction of flow of the fluid within the pipe Pex of the detector 20. Doing so causes the production of a signal electromotive force between a pair of detecting electrodes TA and TB that are disposed in the pipe Pex perpendicular to the magnetic field that is produced by the magnetic excitation coil Lex, where this signal electromotive force is inputted flow rate signal input terminals T1 and T2 of the signal amplifying circuit 12 of the converter 10.

The signal amplifying circuit (differential amplifier) 12 is made from an instrumentation amplifier U1, and performs differential amplification on the flow rate signal that has been inputted from T1 and T2, and outputs the result as an amplified output signal V1. The instrumentation amplifier U1 is structured from a differential amplifier such as an instrumentation amplifier that is commonly used for industrial purposes and instrumentation, where the non-inverting input terminal (−: one of the input terminals) is connected to T1 (a first flow rate signal input terminal), and the non-inverting input terminal (+: the other input terminal) is connected to T2 (a second flow rate signal input terminal), where differential amplification is performed on the flow rate signals that are inputted into the inverting input terminal and the non-inverting input terminal, and has the function of outputting the amplified output signal V1 that is produced from the output terminal (Out), at a single end, with the electropotential at the reference terminal (Ref) as a reference electropotential.

At this time, for U1, one wherein the inverting input terminal and the non-inverting terminal are of the FET input type is used to. As a result, the input impedance of the signal amplifying circuit 12, when viewed from T1 and T2, is extremely high, so that the flow rate signal will not be attenuated. As a result, it is possible to obtain an adequate signal-to-noise ratio even when using an electromagnetic flow meter of a two-wire type, wherein the signal electromotive force is extremely small.

Moreover, because the bias currents that are supplied to the electrode TA and TB side from the signal amplifying circuit 12 from the inverting input terminal and non-inverting input terminal are extremely small, the production of insulating substances due to electrochemical reactions between the detecting electrodes TA and TB and the fluid interfaces are suppressed.

The high-pass filter 14 outputs an output signal S1 wherein low-frequency components, such as DC, have been removed from the amplified output signal V1, and the A/D converting circuit 15 samples of the output signal S1 and performs A/D conversion of the amplitude of the output signal S1.

The controlling circuit 16 performs a calculation process on the A/D-converted value (the amplitude value) obtained from the A/D converting circuit 15, to calculate a flow rate measured value for the fluid that flows in the pipe, and sends the measurement result to a higher-level device from the output interface circuit 17.

A power supply circuit 18 produces and supplies various types of operating power supplies from a power supply that is provided from the higher-level device or from an external power supply.

On the other hand, the fault detecting circuit 13 compares the electropotential of the amplified output signal V1 from the signal amplifying circuit 12 to an upper limit reference electropotential Vj and a lower limit reference electropotential −Vj that have been set in advance, to detect a flow rate signal fault and to output the detection results S2 and S3 to the controlling circuit 16.

The controlling circuit 16 measures the frequency Fs of the output signal S1 and compares it to the variability tolerance range Fex'α of the magnetic excitation frequency Fex, and, based on the comparison result and on the detection results S2 and S3, evaluates the flow rate signal to be normal or in a fault state, and in the event of a fault evaluation, performs a fault process for sending an alarm from the output interface circuit 17 to a higher-level device.

Operation of the Example

Figure 2:
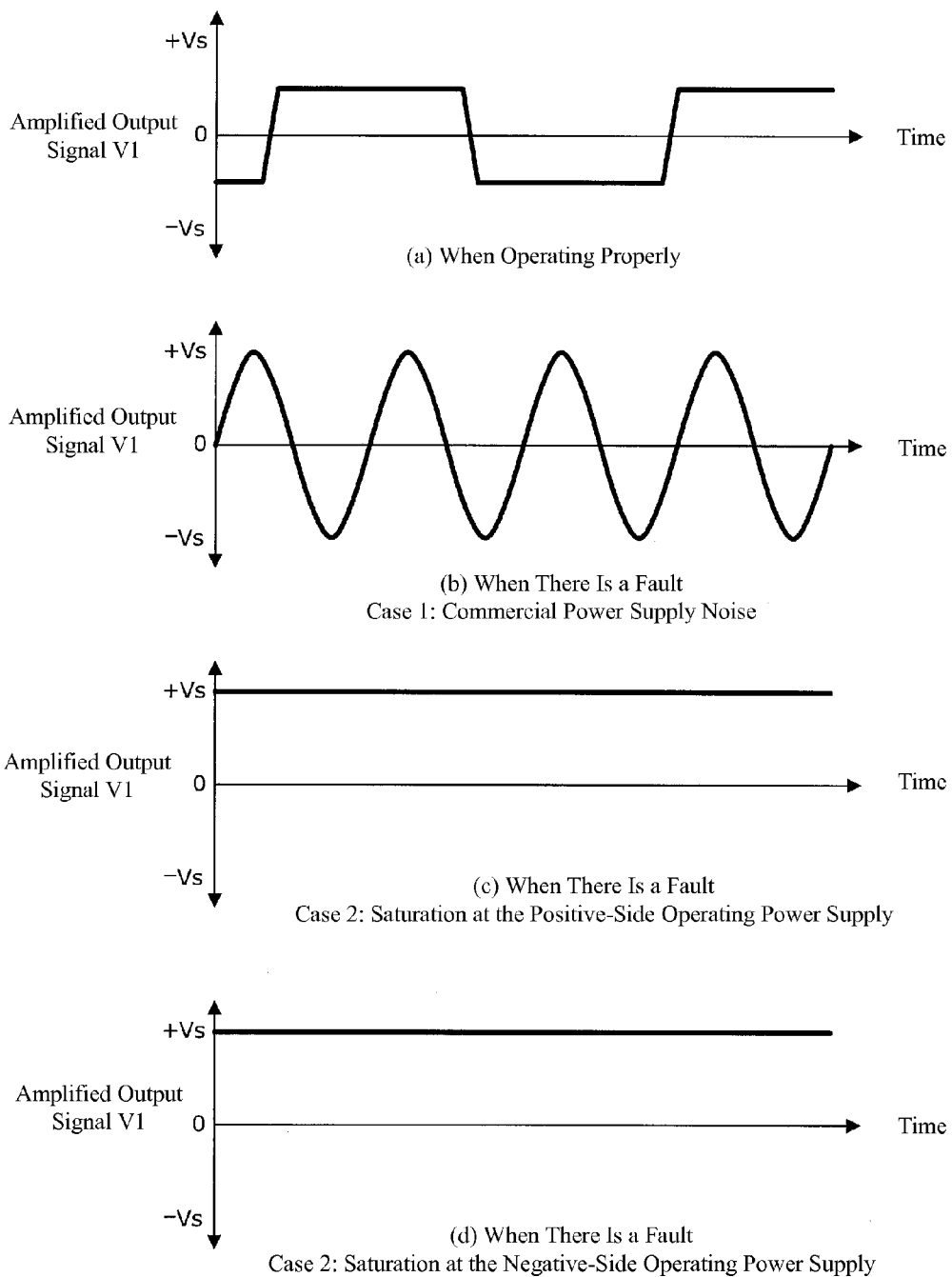
FIG. 2 is a signal waveform diagram illustrating the amplified output signal of the signal amplifying circuit.
Figure 3:
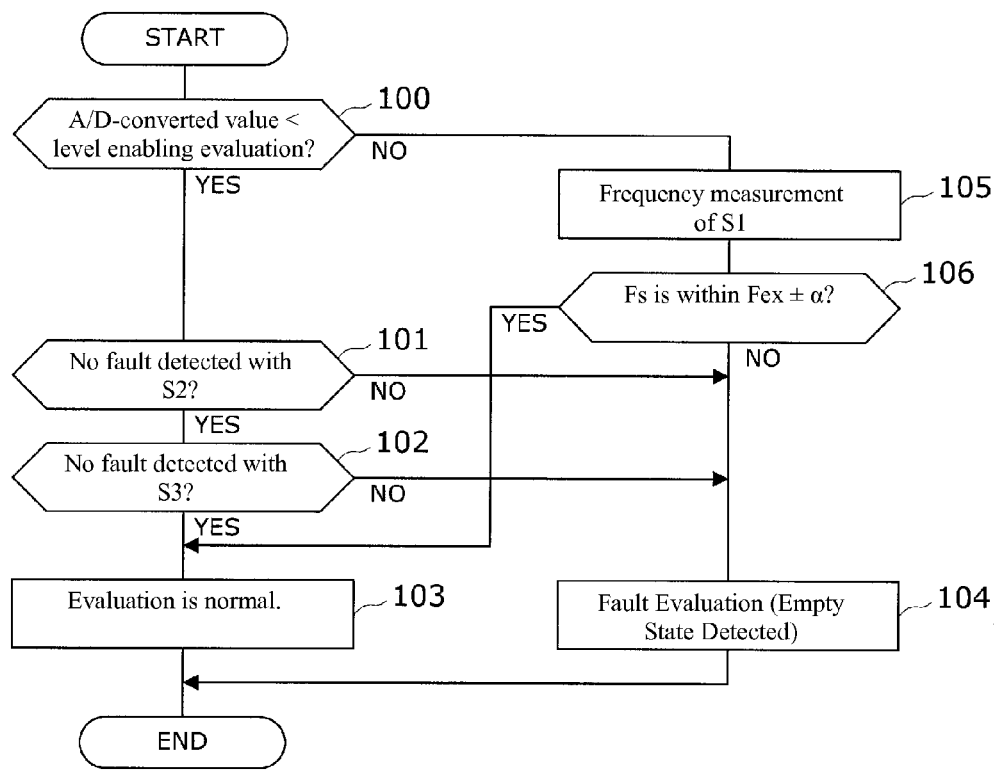
FIG. 3 is a flowchart illustrating the fault evaluating procedure according to the example.

The fault evaluating operation in the controlling circuit 16 of the electromagnetic flow meter 1 according to the present example will be explained next in reference to FIG. 2 and FIG. 3. FIG. 2 is a signal waveform diagram illustrating the amplified output signal of the signal amplifying circuit. FIG. 3 is a flowchart illustrating the fault evaluating procedure according to the example.

If the pipe Pex is filled with fluid so that both of the detecting electrodes TA and TB of the detector 20 are in contact with the fluid, then, as illustrated in FIG. 2 (*a*), the output signal V1 of the signal amplifying circuit 12 will be a normal signal with a frequency that is identical to the magnetic excitation frequency.

On the other hand, if the fluid in the pipe Pex becomes empty so that one or both of the detecting electrodes TA and TB of the detector 20 cease to contact the fluid, or if a signal line in the detector 20 becomes broken or detached, then one or both of T1 and T2 will go into a high-impedance state.

Because of this, the amplified output signal V1 from U1 will be such as one of the cases described below and illustrated in FIG. 2 (*b*) through (*d*).

Case 1: A signal indicating a noise component (such as commercial power noise, or the like) of a frequency that is different from the proper flow rate signal frequency (the magnetic excitation frequency) FIG. 2 (*b*))

Case 2: A signal indicating an electropotential saturated at the positive-side operating power supply +Vs (FIG. 2 (*c*))

Case 3: A signal indicating an electropotential saturated at the negative-side operating power supply −Vs (FIG. 2 (*d*))

The controlling circuit 16, when performing flow rate measurements, executes the fault evaluating process of FIG. 3 at regular intervals.

The controlling circuit 16 first reads in the A/D-converted value (the amplitude value of S1), obtained from the A/D converting circuit 15, and checks whether or not this A/D-converted value is at a level that can be evaluated in a frequency evaluating procedure, described below (Step 100).

If here the A/D converted value (the amplitude value for S1) is less than a level that enables evaluation, so that it is not possible to evaluate the frequency of S1 (Step 100: YES), then the controlling circuit 16 will read in the detection result S2 from U2 in the fault detecting circuit 3 to check whether or not a fault has been detected (Step 101).

If the detection result S2 indicates that no fault has been detected (Step 101: YES), then the controlling circuit 16 reads in the detection result S3 from U3 of the fault detecting circuit 3 to check whether or not a fault has been detected (Step 102).

If the detection result S3 indicates that no fault has been detected (Step 102: YES), then the controlling circuit 16 concludes that the detection signal is normal (Step 103), and terminates the series of fault evaluating processes.

On the other hand, if the detection result S2 indicates that a fault has been detected (Step 101: NO), or the detection result S3 indicates that a fault has been detected (Step 102: NO), then the controlling circuit 16 concludes that there is a fault in the detection signal (Step 104), and terminates the series of fault evaluating processes.

If, in Step 100, the A/D converted value (the amplitude value of S1), obtained by the A/D converting circuit 15, is at least as high as the level wherein a frequency evaluation for 51 is possible (Step 100: NO), then the controlling circuit 16 reads in the output signal S1, wherein the DC component has been cut by the high-pass filter 14, to measure the frequency Fs thereof (Step 105), and compares the signal frequency Fs of S1 to the variability tolerance range Fex±α of the excitation frequency Fex, to check whether or not Case 1 applies (Step 103). At this time, the frequency measuring method may use a well-known method using the CPU. Moreover, a may be set in advance depending on the specification for the electromagnetic flow meter 1 or based on an empirical value.

Here if the signal frequency Fs of S1 is within the variability tolerance range Fex±α (Step 106: YES), then the controlling circuit 16 concludes that the detection signal is normal (Step 103), and terminates the series of fault evaluating processes.

On the other hand, if the signal frequency Fs of S1 is not within the variability tolerance range Fex±α (Step 106: NO), then the controlling circuit 16 concludes that there is a detection signal fault (Step 104), and terminates the series of fault evaluating processes.

Effects of the Example

In this way, in the present example, the signal amplifying circuit 12 has an FET input-type differential amplifier wherein one of the input terminals is connected to the flow rate signal input terminal T1, and the other input terminal is connected to the flow rate signal input terminal T2, to output, from the output terminal, an amplified output signal V1 obtained by performing differential amplification on the flow rate signal, where a fault detecting circuit 13 detects a fault of a flow rate signal by comparing the electropotential of the amplified output signal V1 to an upper limit reference electropotential Vj and to a lower limit reference electropotential −Vj.

That is, if one or both of the detecting electrodes TA and TB of the detector 20 ceases to make contact with the fluid because the fluid within the pipe Pex has become empty, or if a signal line in the detector 20 has become broken or disconnected, then one or both of T1 and T2 will enter a high-impedance state, and the flow rate signal fault is detected by comparing the electropotential of the amplified output signal V1 to the upper limit reference electropotential Vj and the lower limit reference electropotential −Vj, using the case wherein the signal exhibits an electropotential wherein the electropotential of the amplified output signal V1 is saturated at either the positive-side operating power supply +Vs or the negative-side operating power supply −Vs.

This makes it possible to detect a flow rate signal fault state without supplying a DC current to the detecting electrodes TA and TB through the resistive elements.

Moreover, in the present example the controlling circuit 16 may compare the signal frequency Fs of the amplified output signal V1 to the variability tolerance range Fex±α of the excitation frequency Fex, to detect a flow rate signal fault, and if in this detection result, or in the detection result S2 or S3 by the fault detecting circuit 13, a fault has been detected, it may conclude that there is a flow rate signal fault.

This makes it possible to detect a flow rate signal fault even in a case wherein the signal indicates a noise component (such as the commercial power noise) of a frequency that is different from the proper flow rate signal frequency (the magnetic excitation frequency) without being a signal wherein the electropotential of the amplified output signal V1 is an electropotential that is saturated at the positive-side operating power supply +Vs or the negative-side operating power supply –Vs.

Figure 4:
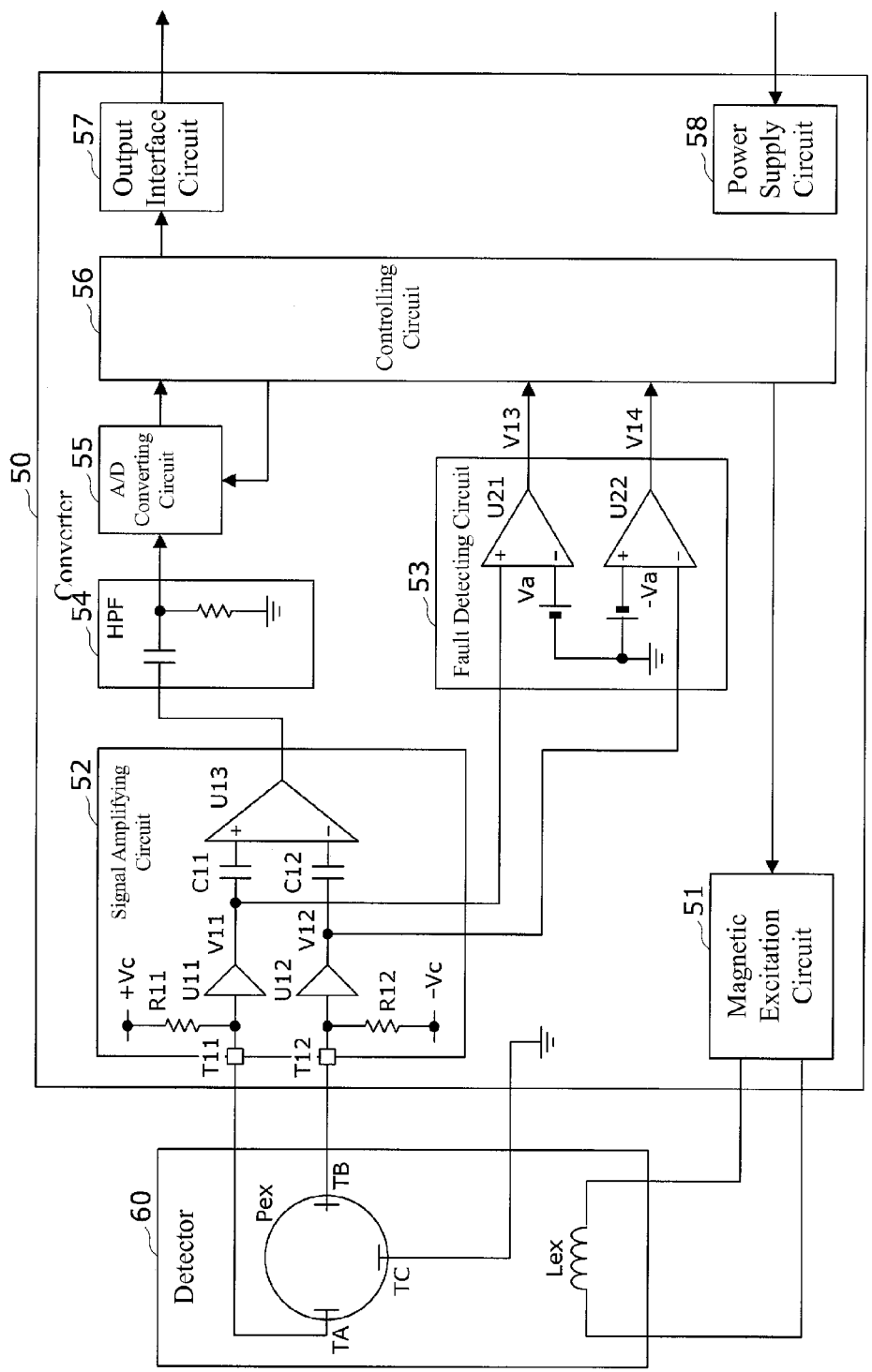
FIG. 4 is a block diagram illustrating the structure of a conventional electromagnetic flow meter.

At this time, the signal amplifying circuit 12 of FIG. 1 does not use the coupling capacitors such as C11 and C12 of the signal amplifying circuit 52 in FIG. 4, as in the conventional technology, but rather the input terminals T1 and T2 are connected directly to the detecting electrodes TA and TB, making it possible to detect, on the output signal side, even faults wherein the fault state at the input terminal is in the DC level.

Because of this, there is no need to perform fault evaluation by adding input buffer amplifiers, such as U11 and U12 in the signal amplifying circuit 52, as illustrated in FIG. 4 of the conventional technology, and sampling the respective outputs thereof, but rather it is possible to identify a fault state of the input terminal using only the output signal of the instrumentation amplifier U1 of a single-chip FET-input type as the differential amplifying circuit for the signal amplifying circuit 12, such as in FIG. 1.

Moreover, while if components such as the buffer amplifiers U11 and U12 or the coupling capacitors C11 and C12 are inserted prior to the differential amplifier, such as in the signal amplifying circuit 52 of FIG. 4, the CMRR (common mode rejection the circuit will suffer of the ability of both, the elegantly, the amplifying circuit 52 will suffer due to the effects of variability of those components, but in the signal amplifying circuit 12 in the present example, there is no loss of performance of the instrumentation amplifier U1, but rather the high CMRR, which is the benefit of an instrumentation amplifier, is maintained, enabling a large improvement in the signal-to-noise ratio over that which is conventional.

Note that while in the present example an example was presented wherein a single-chip FET input-type instrumentation amplifier U1 was used as the differential amplifying circuit for the signal amplifying circuit 12, a differential amplifying circuit that is a combination of a plurality of operational amplifiers and resistive elements may be used instead insofar as the input terminals are of a low bias current and a high input resistance, through the use of an FET input-type operational amplifier as the first stage.

Moreover, when measuring the frequency Fs of the amplified output signal V1 using the controlling circuit 16 based on the output signal S1 from the high-pass filter 14, the measurement may be performed instead by a circuit that is separate from the controlling circuit 16.

Moreover, although when measuring Fs by the controlling circuit 16 S1 is read in after A/D conversion, in the frequency measurement there is no need for high precision in the A/D conversion. Because of this, S1 may be read in using an A/D converting function that is built into the CPU.

Expanded Examples

While the present invention was explained above in reference to the examples, the present invention is not limited by the examples set forth above. The structures and details of the present invention may be modified in a variety of ways, as can be understood by those skilled in the art, within the scope of the present invention.

The invention claimed is:

1. An electromagnetic flow meter wherein a controlling circuit calculates a flow rate measurement value for a fluid that flows in a pipe from an A/D converted value that is obtained through performing A/D conversion after differential amplification has been performed, by a signal amplifying circuit, on a flow rate signal that is detected by a pair of detecting electrodes that are disposed within the pipe and inputted through first and second flow rate signal input terminals, wherein:

the signal amplifying circuit has an FET input-type instrumentation amplifier with one input terminal connected to the first flow rate signal input terminal and the other input terminal connected to the second flow rate signal input terminal, which outputs, from the output terminal, an amplified output signal obtained through performing differential amplification on the flow rate signal; and a fault detecting circuit that detects the flow rate signal fault through comparing the electropotential of the amplified output signal to an upper limit reference electropotential and a lower limit reference electropotential.

2. The electromagnetic flow meter as set forth in claim 1, wherein:

the controlling circuit detects a flow rate signal fault through comparing the frequency of the amplified output signal to a magnetic excitation frequency variability tolerance range, and if the detection result thereof or the detection result by the fault detecting circuit is that a fault has been detected, concludes that there is a fault in the flow rate signal.

* * * * *